United States Patent
Goldstein

(10) Patent No.: US 6,374,287 B1
(45) Date of Patent: Apr. 16, 2002

(54) METHOD AND SYSTEM FOR ALLOWING CLIENT PROCESSES TO RUN ON DISTRIBUTED WINDOW SERVER EXTENSIONS

(75) Inventor: Richard M. Goldstein, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/085,132

(22) Filed: May 26, 1998

Related U.S. Application Data

(63) Continuation of application No. 08/590,800, filed on Jan. 24, 1996, now abandoned.

(51) Int. Cl.$^7$ .............................................. G06F 13/00
(52) U.S. Cl. ...................................... 709/201; 709/203
(58) Field of Search ................................ 709/217, 219, 709/304, 203, 200, 201, 218, 300

(56) References Cited

U.S. PATENT DOCUMENTS

| | | | | |
|---|---|---|---|---|
| 5,230,051 A | * | 7/1993 | Quan ........................... 709/300 |
| 5,341,478 A | * | 8/1994 | Travis, Jr. et al. ........... 395/200 |
| 5,377,350 A | | 12/1994 | Skinner ........................ 709/316 |
| 5,426,725 A | | 6/1995 | Kilgore ........................ 707/515 |
| 5,442,791 A | * | 8/1995 | Wrabetz et al. .............. 395/650 |
| 5,471,615 A | * | 11/1995 | Amatsu et al. .......... 395/200.03 |
| 5,497,463 A | | 3/1996 | Stein et al. .................. 709/203 |
| 5,544,320 A | | 8/1996 | Konrad ........................ 709/203 |
| 5,566,336 A | | 10/1996 | Futatsugi et al. .............. 717/1 |
| 5,590,288 A | * | 12/1996 | Castor et al. .......... 395/200.03 |
| 5,606,493 A | * | 2/1997 | Duscher et al. ............. 364/134 |
| 5,613,090 A | * | 3/1997 | Willems ...................... 709/302 |
| 5,640,564 A | * | 6/1997 | Hamilton et al. ........... 709/303 |
| 5,668,997 A | | 9/1997 | Lynch-Freshner et al. .. 709/329 |
| 5,671,414 A | * | 9/1997 | Nicolet ........................ 395/684 |
| 5,727,147 A | * | 3/1998 | Hoff ............................ 709/200 |
| 5,832,219 A | * | 11/1998 | Pettus ......................... 709/203 |
| 5,930,473 A | * | 7/1999 | Teng et al. ............. 395/200.34 |
| 6,088,515 A | * | 7/2000 | Muir et al. ............. 395/200.47 |

\* cited by examiner

Primary Examiner—Moustafa M. Meky
(74) Attorney, Agent, or Firm—Beyer Weaver & Thomas, LLP

(57) ABSTRACT

Techniques for executing client processes on window servers are disclosed. The techniques allow a client process requiring one or more window extensions to run on a local window server without requiring the local server to support the one or more window extensions. The one or more window extensions can be supported by a remote window server. Accordingly, client processes are able to execute on computer systems that do not locally support the window server or window server extensions, which are required by the client processes.

20 Claims, 5 Drawing Sheets

METHOD AND SYSTEM FOR ALLOWING CLIENT PROCESSES TO RUN ON DISTRIBUTED WINDOW SERVER EXTENSIONS

This is a continuation of application Ser. No. 08/590,800, filed Jan. 24, 1996 which is incorporated herein by reference, and now abandoned.

FIELD OF THE INVENTION

The present invention relates to a method and system for facilitating process execution through use of distributed window server extensions.

BACKGROUND OF THE INVENTION

Typically, a process will fail to work properly if a user attempts to run the process on a computer that does not fully support a window server extension that the process needs to run. For example, the Help Viewer process of the AnswerBook product from Sun Microsystems relies on the Display Postscript window server extension, and will fail to run properly if invoked on a computer that does not fully support the Display Postscript extension.

In order to overcome this problem Adobe System's Inc. markets a product named "Display Postscript NX Agent," which allows a client process that requires the Display Postscript extension to run in an environment that does not support the Display Postscript extension. Display Postscript NX Agent implements this functionality by interposing program code between the client process and a window server that controls interactions with the display device. The interposed program code intercepts requests to the Display Postscript extension and translates those requests into a native protocol supported by the host computer (e.g., the X-protocol).

The method used by Adobe Systems, Inc. has several drawbacks. For example, it requires a substantial amount of programmer time and effort to design, code, test, and support the program code used to translate requests for the Display Postscript extension into requests to a window server that is supported by the host computer. This deficiency becomes even more pronounced as the variety of native protocols increases. For example, if a given host computer could be configured to support any one of "N" separate protocols then "N" different translations would have to be developed by Adobe in order to ensure cross-platform portability of the NX Agent product.

Another drawback of the NX Agent product is that in order to use NX Agent, the program's synchronization component must be aware that NX Agent is installed on the target computer. In other words, its use is not transparent to the program. Furthermore, NX Agent is an ad-hoc solution tied to Adobe's Display Postscript product and, therefore, is not a general purpose software solution.

It would be beneficial to provide a method and system which overcomes the deficiencies of the prior art.

SUMMARY OF THE INVENTION

A preferred embodiment of the present invention presents an elegant and simple way of allowing client processes to run on window servers that do not natively support a particular window server extension that the client process may wish to use. Obviously, this problem may arise in systems which have the memory capacity to support a particular window server extension but which, nevertheless, do not support that extension. The problem may also arise in other contexts. For example, the problem also arises in computers, such as x-terminals or "internet" computers, which are memory limited and therefore, do not have enough memory capacity to effectively use the window server extension.

Various embodiments of the invention overcome the limitations of the prior art by providing a method and system that receives a request to use a particular extension, recognizes that the particular extension is not supported locally and, in response to that recognition, locates, invokes, and then uses the desired extension while that extension resides on a remote computer.

NOTATIONS AND NOMENCLATURE

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be born in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

DETAILED DESCRIPTION

A preferred embodiment of the present invention presents an elegant and simple way of allowing client processes to run on window servers that do not natively support a particular window server extension that the client process may wish to use. Obviously, this problem may arise in systems which have the memory capacity to support a particular window server extension but which, nevertheless, do not support that extension. The problem may also arise in other contexts. For example, the problem also arises in computers, such as x-terminals or "internet" computers, which are memory limited and therefore, do not have enough memory capacity to effectively use the window server extension.

Various embodiments of the invention overcome the limitations of the prior art by providing a method and system that receives a request to use a particular extension, recognizes that the particular extension is not supported locally and, in response to that recognition, locates, invokes, and then uses the desired extension while that extension resides on a remote computer.

Figure 1:
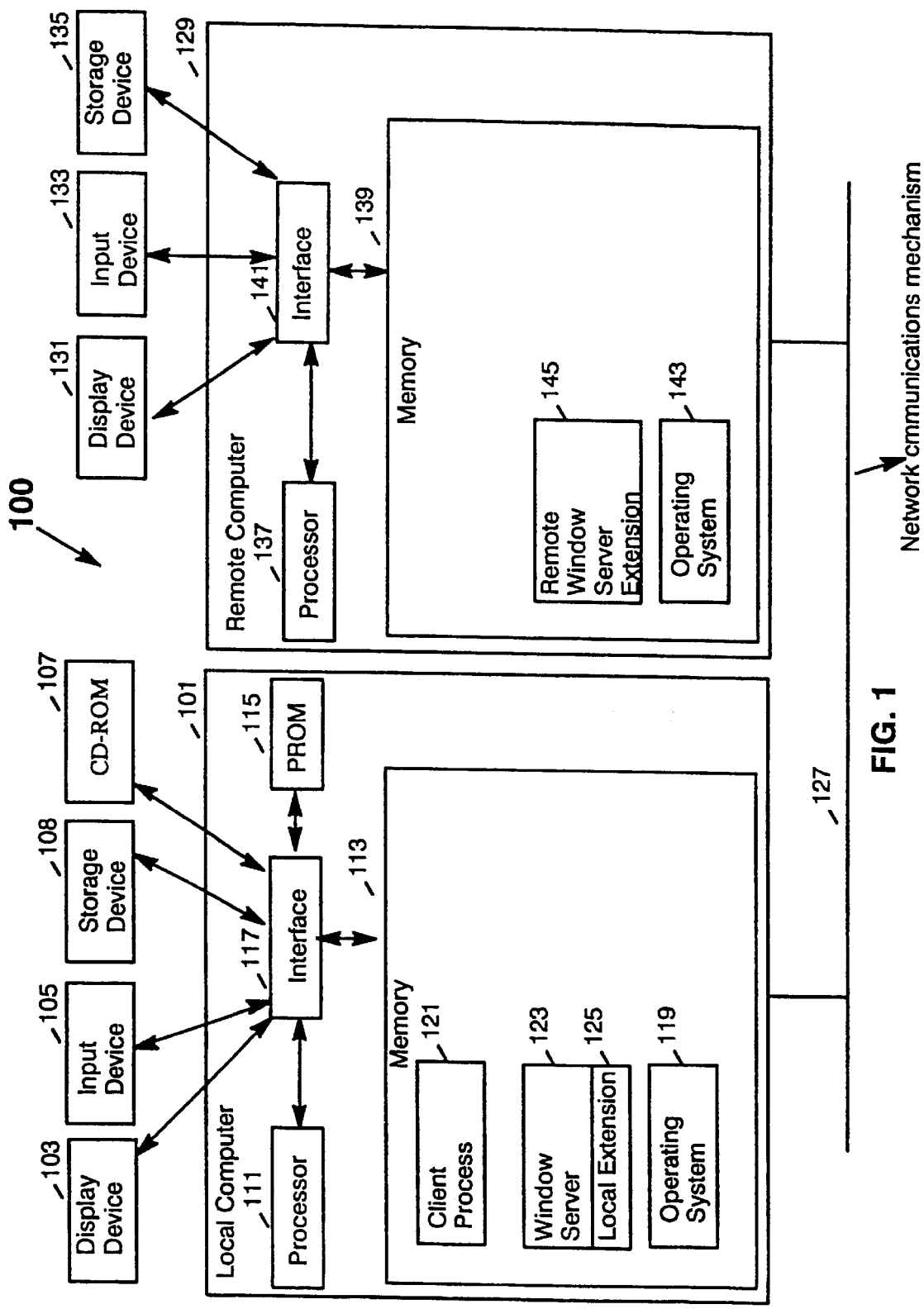
FIG. 1 is a block diagram of a network computer system for practicing the preferred embodiment of the present invention.

FIG. 1 is a block diagram of a network computer system 100 for practicing the preferred embodiment of the present invention. The computer system 100 includes a local computer 101, a video display device 103, an input device 105, such as a keyboard, mouse, or pointing device, a CD-ROM drive 107, and a permanent storage device 109, such as a disk drive.

The computer 101 includes a processing unit 111 a random access memory ("RAM") 113, a programmable read-only memory ("PROM") 115, and an interface 117 for enabling communication between the processing unit 111 and the RAM 113 or the PROM 115, The interface 117 also facilitates communication between the processing unit 111 and peripheral devices (e.g., the video display device 103, the input device 105, and the CD-ROM device 107). While FIG. 1 illustrates the local computer's memory being separated into a CD-ROM 107, a storage device 109, a random access memory 113, and a PROM 115, and the program and data of the present invention being stored in various ones of these memory devices, those of ordinary skill will understand that the programs and data used by the present invention could be stored and retrieved from various other combinations of these or other storage devices.

The computer memory 113 holds a number of items, including an operating system 119 that is responsible for controlling the allocation and usage of the system's hardware resources, such as memory 113, processing unit 111, and CD-ROM drive 107. The preferred operating system is the Solaris operating system from Sun Microsystems, Inc., of Mountain View, Calif.[1]

[1]. Sun and Solaris are trademarks or registered trademarks of Sun Microsystems, Inc., in the United States and other countries.

The computer memory 113 also holds a client application 121, a window server 123, and a window server extension ("local extension") 125, which combine to form a windowing system for managing input and output on the display device 103. The X Window System™ is the preferred windowing system of the present invention for managing input and output on a GUI. The X Window System is a combination of an X protocol, an X display server, X clients, and Xlib routines. X clients are applications (such as client application 121), which use a computer's display device. The X client formats its requests using the X protocol and sends the requests to the X display server (e.g., window server 123). The X display server is a process which manages outputs to the frame buffer and inputs from the keyboard and mouse. The X display server considers anything from the keyboard and mouse as events to be reported to the clients. For example, when a user presses and releases a mouse button in a window on a GUI, the X server sends these input events to the X client application associated with that window. The X client examines the input event and determines what action to take. Typically, a series of calls are made in response to each event. Therefore, in response to receiving an event, the X client makes the appropriate calls into the X window server routines (e.g., the routines of the local extension 125) to perform the appropriate action. The X window server routines send requests to the X display server which, in turn, updates the GUI. More detailed information on the X Window System can be found in *X Window System Programming,* by Naba Barkakati, which is incorporated herein by reference.

The network computer system 100 also includes a network communications mechanism 127 for connecting the local computer 101 with the remote computer 129, a video display device 131, an input device 133, such as a keyboard, mouse, or pointing device, and a permanent storage device 135, such as a disk drive.

The computer 129 includes a processing unit 137 a random access memory ("RAM") 139, and an interface 141 for enabling communication between the processing unit 137 and the RAM 139. The interface 141 also facilitates communication between the processing unit 137 and peripheral devices (e.g., the video display device 131 and the input device 133). While FIG. 1 illustrates the remote computer's memory being separated into a storage device 135 and a random access memory 139, and the program and data of the present invention being stored in various ones of these memory devices, those of ordinary skill will understand that the programs and data used by the present invention could be stored and retrieved from various other combinations of these or other storage devices.

The computer memory 139 holds a number of items, including an operating system 143 that is responsible for controlling the allocation and usage of the system's hardware resources, such as memory 139 and processing unit 137. The preferred operating system is the Solaris operating system from Sun Microsystems, Inc., of Mountain View, Calif.[1]

[1]. Sun and Solaris are trademarks of registered trademarks of Sun Microsystems, Inc., in the United States and other countries.

The computer memory 139 also holds a remote window server extension ("remote extension") 145. As is discussed in more detail below, the remote extension processes requests from the client application 121 to manage input and output on the display device 103. The remote extension processes the requests by converting them into a native protocol which itself can be processed by the window server 123.

Exemplary Embodiments

Figure 2:
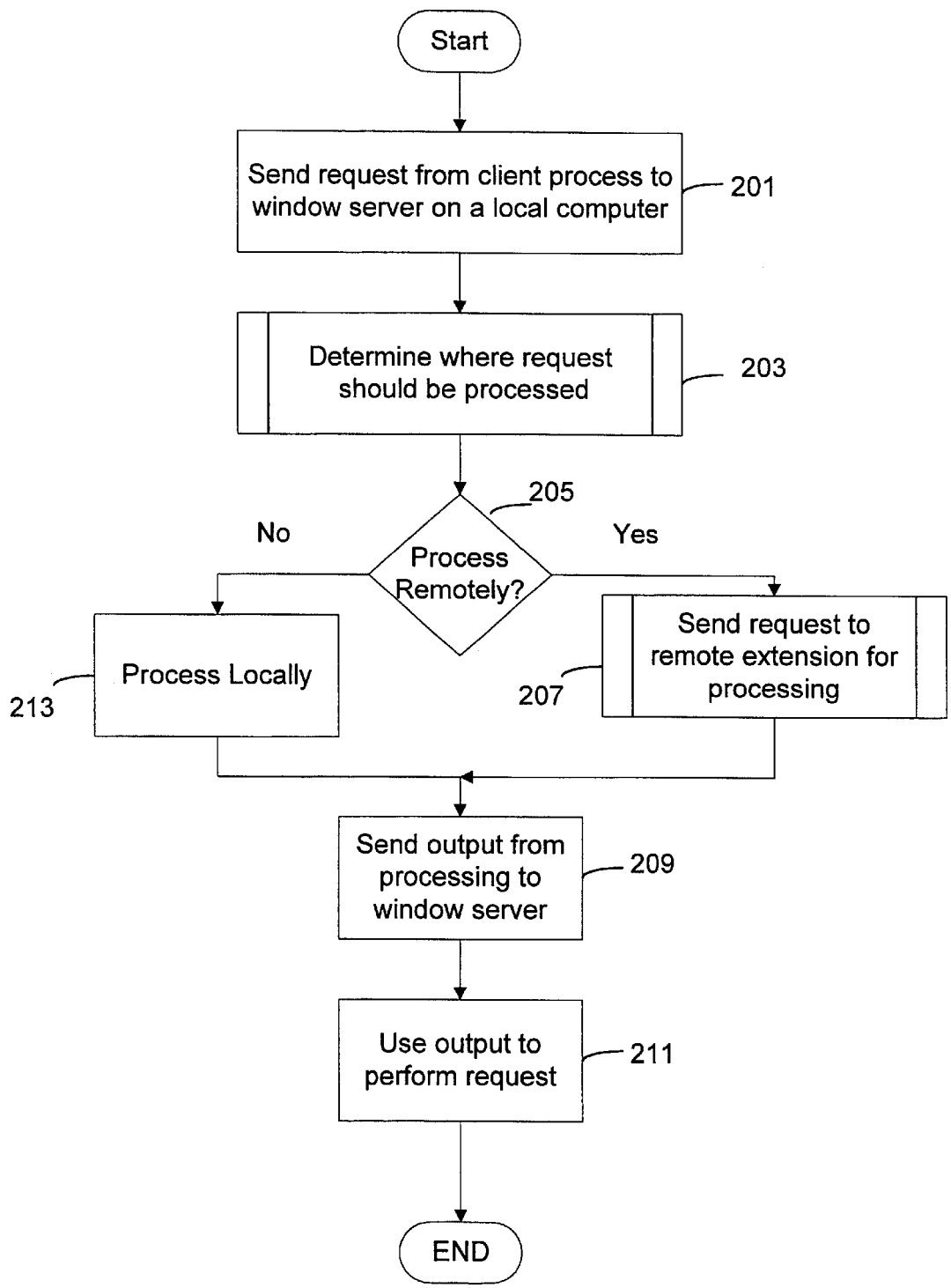
FIG. 2 is a flow diagram which provides an overview of the preferred steps taken in one embodiment of the present invention for allowing client processes to run on window servers that do not natively support a particular window server extension that the client process may wish to use.

The preferred embodiment of the present invention is perhaps best described by way of example. FIG. 2 is a flow diagram which provides an overview of the preferred steps taken in one embodiment of the present invention for allowing client processes to run on window servers that do not natively support a particular window server extension that the client process may wish to use. In step 201, the local window server 123 receives a request from the local client process 121 to perform an action. For example, the request may call for a user interface on the display device 103 to be updated in response to a button selection by a user. The window server examines the request and determines whether the request can be processed by program code residing on the local computer 101 or whether the request needs to be processed by a window server extension which resides on the remote computer 129 (step 203). If the request should be processed remotely (step 205), then the window server sends the request to the remote extension 145 residing on the remote computer 129 (step 207), where the remote extension processes the request in such a way that the output from the processing can itself be processed by the window server 123. For example, in one embodiment of the invention the remote extension converts the request into an x-protocol. Thus, when the remote extension sends the output back to the window server (step 209), the window server processes the output to perform the action specified in the request (step 211).

Returning to the discussion of step 205, if the window server determines that the request should not be processed remotely, then the window server 123 or the local extension 125 is invoked to process the request in ways previously known in the art to perform the action specified in the request (steps 213, 209, and 211).

Figure 3:
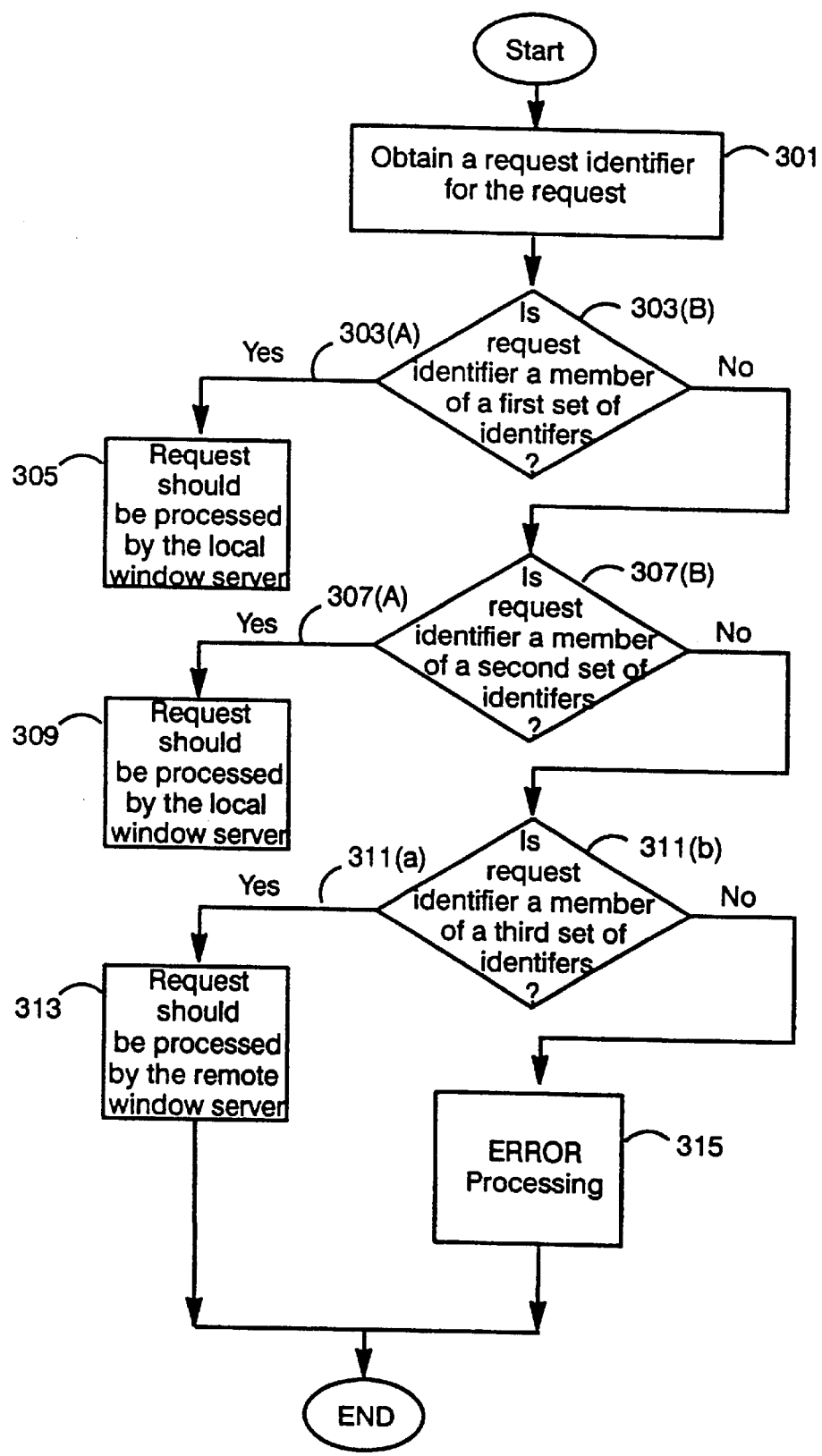
FIG. 3 is a flow diagram that illustrates the preferred steps for determining whether a request should be processed by a local computer or by a remote computer.

FIG. 3 is a flow diagram that illustrates the preferred steps for determining whether a request should be processed by a local computer or by a remote computer. FIG. 3 performs this functionality by comparing a request identifier, extracted from the request itself, with predetermined values which represent, respectively, the request identifiers which can be processed locally, and the request identifiers which should be processed remotely. In step 301, the window server 123 receives the request from the client process 121 and obtains a request identifier for the request. If the request identifier is a member of a first set of identifiers (step 303(*a*)) then the method determines that the request should be processed by the window server 123 (step 305). In one embodiment, the request identifier is an integer value which is compared to a first threshold value. If the value of the request identifier is below the threshold value then the method determines that the request should be processed by the window server. Those of ordinary skill will understand that other schemes could be used to determine where the request identifier indicates the request should be processed.

If the request identifier is not a member of the first set of identifiers (step 303(*b*)) then the method determines whether the request identifier is a member of a second set of identifiers. If the request identifier is a member of the second set of identifiers (step 307(*a*)) then the method determines that the request should be processed by the local window server extension 125 (step 309). In one embodiment, the request identifier is an integer value which is compared to a second threshold value. If the value of the request identifier is below the second threshold value and above the first threshold value then the method determines that the request should be processed by the local window server extension.

If the request identifier is not a member of either the first or second sets of identifiers (step 307(*b*)) then the method determines whether the request identifier is a member of a third set of identifiers. If the request identifier is a member of the third set of identifiers (step 311(*a*)) then the method determines that the request should be processed by the remote window server extension 145 (step 313). In one embodiment, the request identifier is an integer value which is compared to the second threshold value. If the value of the request identifier is above the second threshold value then the method determines that the request should be processed by the remote window server extension 145. Error processing occurs (step 315) if the request identifier is not a member of the first, second, or third set of identifiers.

Figure 4:
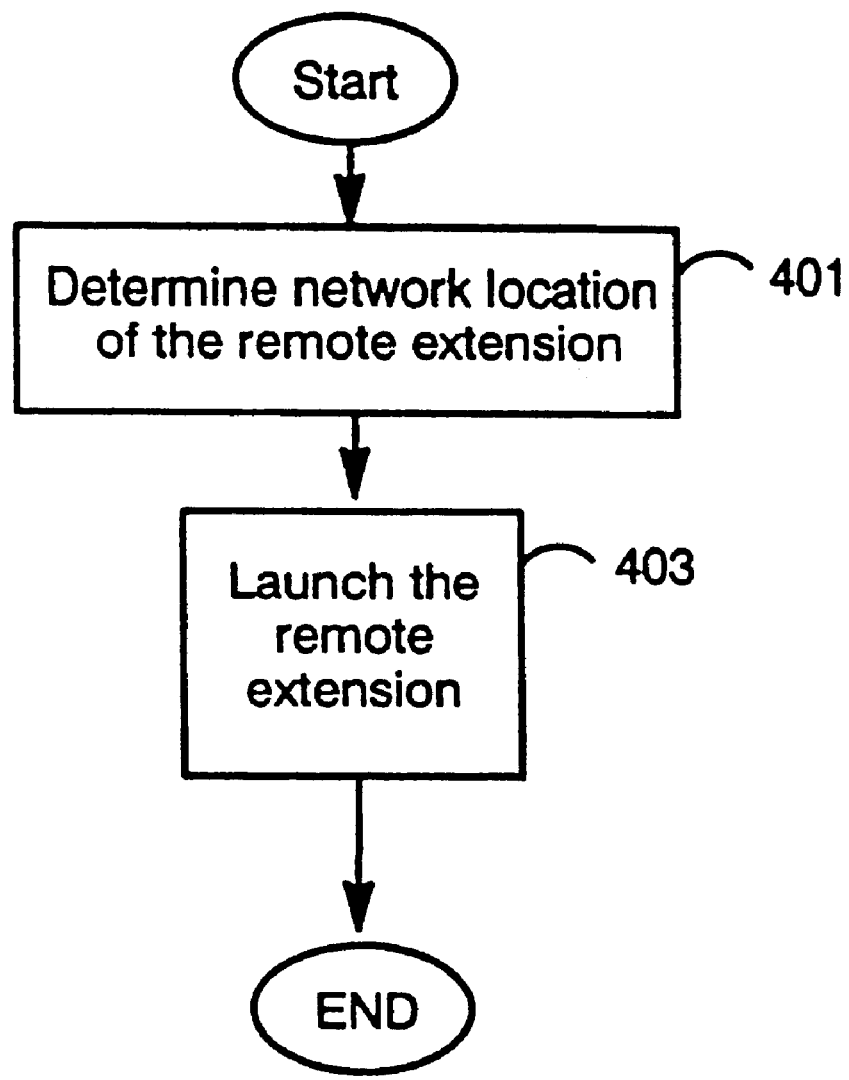
FIG. 4 is a flow diagram illustrating the preferred steps for sending the request to the remote extension.

FIG. 4 is a flow diagram illustrating the preferred steps for launching the remote extension. In step 401, the method determines the network location of the remote extension and opens up a physical connection to the remote extension. In one embodiment the method accesses a configuration file (not shown) and retrieves the network location of the remote extension from the file. The network location of the remote extension is typically preconfigured but may also be added to the configuration file during software installation. Embodiments of the present invention augment existing configuration files in order to insert the desired network location information.

In yet another embodiment, the method retrieves the location of the remote extension from a configuration file used to dynamically load window server extensions. The X Consortium is working on a standard method for loading X window server extensions dynamically, which uses a configuration file to specify the name of the extension to load and the location of that extension. On current systems supplied by Sun Microsystems, the OW config configuration file is analogous to the loadable configuration file being developed by the X Consortium. In this embodiment, the developer leverages the X Consortium standard, assuming it completes, such that the network information needed to locate the remote window server extension, will be added to the existing set of information for the dynamic extensions. This information will typically be set up as part of the software's installation procedure.

Once the location of the window server extension is determined and a connection is established with the remote server, the remote extension is launched, for example, by having the method send a request to the remote computer to launch the remote extension (step 403).

Figure 5:
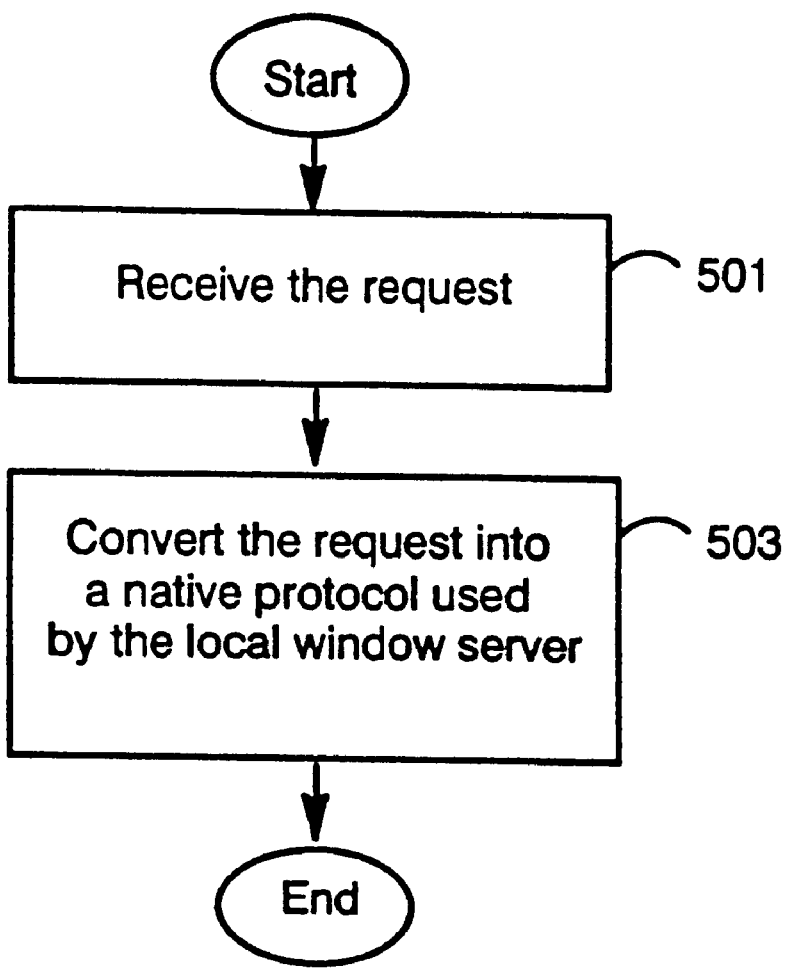
FIG. 5 is a flow diagram illustrating the preferred steps performed by the remote extension in order to process the request.

FIG. 5 is a flow diagram illustrating the preferred steps performed by the remote extension in order to process the request. In step 501, the remote extension receives the request. In step 503, the remote extension converts the request into a native protocol used by the window server 123. For example, the remote extension may convert the request into the x-protocol for processing by the window server.

Using the techniques of the present invention, client processes are able to execute on computer systems which do not locally support the window server or window server extension to which the client process was written. Moreover, the present invention provides this improved functionality in a way which is transparent to the client process. In other words, the developer of the client process need not be concerned with the location of the window server code when writing the client process. The developer merely assumes that the appropriate window server is accessible to the client process and that the system will take care of the details of finding, launching, and processing the a given request.

While specific embodiments of the present invention have been described above, these descriptions should be considered to be illustrative and not restrictive. Thus, those of ordinary skill in this area of technology will understand that various modifications may be made to the description set forth above without departing from the spirit and scope of the invention. For example, while the example above discusses remotely accessing a window server extension, those of ordinary skill will understand that the window server itself could be remotely accessed instead. While the example above discusses processing the request using a remote extension on a remote computer, those of ordinary skill in this area will understand that the remote extension could first be downloaded onto the local computer before processing by the remote extension takes place.

What is claimed is:

1. A method executable in a computer system for facilitating the processing of a windowing request, the computer system including a local computer and a remote computer, the method comprising the steps of:

under control of a client process on the local computer,
receiving an event from a window server on the local computer, the window server managing inputs from and outputs to a user interface on the local computer; and
sending to the window server, in response to receipt of the event, a windowing request to perform a specified action on the user interface; and under control of the window server,
receiving the windowing request;
determining whether the windowing request can be processed by a local windowing extension configured to process windowing requests on the local computer; and
sending the windowing request to a remote windowing extension on the remote computer if the local windowing extension is not configured to process windowing requests for the specified action on the user interface, and the remote windowing extension is configured to process such windowing requests.

2. The method of claim 1 wherein the step of determining further comprises the steps of:
retrieving a request identifier from the request;
determining whether the retrieved request identifier is one of the identifiers associated with a first set of identifiers; and
sending the request to the remote extension when it is determined that the request identifier is one of the identifiers associated with the first set of identifiers.

3. The method of claim 1 wherein the step of sending the request to the remote extension further comprises the steps of:
under control of the window server,
determining the location of a remote extension associated with the retrieved request identifier by accessing one of a configuration file and a name service process.

4. The method of claim 1 further comprising the steps of:
under control of the remote extension,
receiving the request;
converting the request into a native protocol used by the window server; and
sending the native protocol from the remote extension to the window server.

5. The method of claim 4 further comprising the steps of:
under control of the window server,
receiving the native protocol; and
processing the native protocol to perform the specified action.

6. The method of claim 1, wherein said step of sending the windowing request further includes obtaining network location information for the remote extension.

7. A computer system for facilitating the processing of a windowing request, the computer system including a local computer and a remote computer, the computer system comprising:

a client process on the local computer configured to,
receive an event from a window server on the local computer, the window server managing inputs from and outputs to a user interface on the local computer; and
send to the window server, in response to receipt of the event, a windowing request to perform a specified action on the user interface; and a window server configured to,
receive the windowing request;
determine whether the windowing request can be processed by a local windowing extension configured to process windowing requests on the local computer, and
send the windowing request to a remote windowing extension on the remote computer if the local windowing extension is not configured to process windowing requests for the specified action on the user interface, and the remote windowing extension is configured to process such windowing requests.

8. The computer system of claim 7 wherein the window server further comprises:
a module configured to retrieve a windowing request identifier from the windowing request;
a module configured to determine whether the retrieved windowing request identifier identifies a request to be processed by the remote extension; and
a module configured to send the windowing request to the remote extension when the windowing request identifies such a remote extension request.

9. The computer system of claim 8 wherein the module configured to send the windowing request to the remote extension further comprises:
the window server configured to,
determine the location of such a remote extension associated with the retrieved windowing request identifier by accessing one of a configuration file and a name service process.

10. The computer system of claim 7 further comprising:
the remote extension configured to,
receive the request;
convert the request into a native protocol used by the window server; and
send the native protocol from the remote extension to the window server.

11. The computer system of claim 10 further comprising:
the window server configured to,
receive the native protocol; and
process the native protocol to perform the specified action.

12. The computer system of claim 7 further including a configuration file adapted to allow a computer to load dynamically a window server extension.

13. Computer readable media including computer program code for facilitating the processing of a windowing request, the computer readable media comprising:
client process computer program code that,
receives an event from a window server on a local computer, the window server managing inputs from and output to a user interface on the local computer; and
sends to the window server, in response to receipt of the event, a windowing request indicating that a specified action should be performed on the user interface; and
window server computer program code that,
receives the windowing request;
determines whether the windowing request can be processed by a local windowing extension configured to process windowing requests on the local computer; and sends the windowing request to a remote windowing extension on the remote computer if the local windowing extension is not configured to process windowing requests for the specified action on the user interface, and the remote windowing extension is configured to process such windowing requests.

14. The computer readable media of claim 13 wherein the window server computer program code that determines further comprises:

computer program code that retrieves a windowing request identifier from the windowing request;

computer program code that determines whether the retrieved windowing request identifier identifies a request to be processed by the remote extension; and computer program code that sends the windowing request to the remote extension when the windowing request identifier identifies such a remote extension.

15. The computer readable media of claim 14 wherein the computer program code that sends the windowing request to the remote extension further comprises:

computer program code that determines the location of such a remote extension associated with the retrieved windowing request identifier by accessing one of a configuration file and a name service process.

16. The computer readable media of claim 13 further comprising:

remote extension computer program code that, receives the windowing request;

converts the windowing request into a native protocol used by the window server; and sends the native protocol from the remote extension to the window server.

17. The computer readable media of claim 16 further comprising:

window server computer program code that, receives the native protocol; and processes the native protocol to perform the specified action.

18. A computer data signal on a carrier wave containing computer-executable instructions for allocating memory resources in a computer, said instructions being configured to cause a computer to execute the steps of:

providing a first window server configured to determine whether a windowing request to a first window server extension to perform a specified action on the user interface of said computer can be processed by program code installed on said computer;

providing a communication mechanism configured to allow requests to window server extensions to be processed by a second window server extension installed on a remote computer, said second window server being configured to process such windowing requests, upon determining that said first window server is not configured to process such windowing requests;

sending said windowing request from said computer to said remote computer; and processing said windowing request at said remote computer.

19. The computer data signal of claim 18 wherein the computer-executable instructions configured to cause the computer to provide a first window server configured to determine whether a request to said first window server extension can be processed by local program code further includes computer-executable instructions configured to:

generate a windowing request identifier that indicates whether the request can be processed locally; and determine whether said request can be processed by program code installed on said computer by examining said identifier.

20. The data signal of claim 19, wherein said computer data signal further includes computer-executable instructions configured to provide a configuration file adapted to allow a computer to load dynamically a window server extension.

* * * * *